United States Patent [19]

Sato et al.

[11] 4,270,029
[45] May 26, 1981

[54] SELECTION SYSTEM FOR DIGITAL SIGNAL REPEATERS

[75] Inventors: Masanori Sato, Machida; Hiroharu Wakabayashi, Nakamura; Yoshihiro Ejiri, Tokyo; Hitoshi Yamamoto, Kawasaki, all of Japan

[73] Assignee: Kokusai Denshin Denwa Kabushiki Kaisha, Tokyo, Japan

[21] Appl. No.: 20,873

[22] Filed: Mar. 15, 1979

[30] Foreign Application Priority Data

Mar. 23, 1978 [JP] Japan .................................. 53/32344
Mar. 23, 1978 [JP] Japan .................................. 53/32345

[51] Int. Cl.$^3$ .............................................. H04B 1/60
[52] U.S. Cl. ......................... 179/175.31 R; 178/69 G; 179/170 F
[58] Field of Search .................. 179/170 F, 175.31 R, 179/175.3 R, 175.3 F, 15 BF; 340/146.1 E; 178/69 G, 70 R, 71 R, 73; 328/164

[56] References Cited

U.S. PATENT DOCUMENTS

| 3,678,222 | 7/1972 | Boehly | 179/175.31 R |
| 3,866,217 | 2/1975 | Bennett, Jr. | 340/146.1 E |
| 4,022,988 | 5/1977 | Lentz et al. | 179/175.31 R |

*Primary Examiner*—Thomas A. Robinson
*Attorney, Agent, or Firm*—Robert E. Burns; Emmanuel J. Lobato; Bruce L. Adams

[57] ABSTRACT

A digital signal repeater selecting system for a digital signal transmission system equipped with a plurality of digital signal repeaters disposed on a transmission line at desired intervals, in which there are provided in each of the repeaters a delay circuit having a particular delay time corresponding to an integral multiple of the unit code length of a digital signal and assigned to the repeater and having its input terminal connected to the transmission line, and a code comparator for comparing the input signal to and the output signal from the delay circuit with each other to produce a predetermined output signal when the both signals are decided to be substantially identical with each other, and in which when a repeater selecting code train repeating in synchronism with the delay time is applied to the transmission line, the repeater to which the delay time is assigned produces the predetermined output signal from the code comparator to allow an operation of selecting the repeater. The above principle can be applied to monitor the condition of the transmission line.

7 Claims, 5 Drawing Figures

SELECTION SYSTEM FOR DIGITAL SIGNAL REPEATERS

BACKGROUND OF THE INVENTION

1. Field of the Invention

This invention relates to a repeater selection system for identifying and selecting a desired one of a plurality of repeaters in a digital signal transmission system.

This invention further relates to a monitor system for a PCM code or like digital signal relay system which monitors the characteristic of the relay system and detects and locates faults in a repeater and in the transmission line section between adjacent repeaters.

2. Description of the Prior Art

In a digital signal transmission line system, there have heretofore been employed for monitoring repeaters or the fault location a pulse trio system (refer to Nippon Telegraph and Telephone Public Corporation, Reports of Studies and Practical Applications, Vol. 14, No. 1), a phase detection system (refer to Nippon Telegraph and Telephone Public Corporation, Reports of Studies and Practical Applications, Vol. 25, No. 1), a bipolar check system (refer to the Institute of Electronics and Communication Engineers of Japan, the Society for the Study of Communication Systems, data CS-72-156), etc. All of these systems are of the type employing a monitoring line, called an interstitial copper pair, for the transmission of a repeater identify signal or a signal turned back from a repeater, and adopting a method of discriminating repeaters in terms of frequencies, that is, a method which uses a band-pass filter of a frequency peculiar to each repeater and provides on the transmission line a signal having a code configuration of high energy density at the frequency of the band-pass filter for a desired repeater to identify or select the repeater by an increase in the output level of the band-pass filter. In a long distance digital transmission system, however, the use of the interstitial copper pair is disadvantageous for the following reasons:

(1) A long transmission distance necessitates repeaters in the interstitial copper pair, resulting in complexity in the system arrangement.

(2) The reliability of the interstitial copper pair transmission system must be designed very high, which is uneconomical from the standpoint of the design of the entire system.

(3) The use of the interstitial copper pair introduces complexity in the cable structure. Therefore, a system which monitors the transmission system by utilizing a main transmission line without employing the interstitial copper pair is very effective from the viewpoints of simplification and economization of the entire transmission system.

In an ordinary land digital signal transmission line system, use is made of an arrangement in which a plurality of pairs of backward and forward transmission lines are housed in one cable and regeneration is achieved by regenerative repeater circuits for the forward and backward directions disposed in the same repeater housing. With such an arrangement, it is possible to provide an additional circuit in each repeater and to couple the backward and forward regenerators to each other via the additional circuit. For an optical fiber transmission system employing an optical fiber as a transmission line, there has been proposed a system in which a signal in the backward transmission line is sent back to the forward transmission line via a switch in an electric circuit of an optical repeater (refer to Japanese Pat. No. 99904/76). This system does not employ the aforesaid interstitial copper pair but, for selecting a desired repeater and controlling the switch, uses a method of identifying repeaters in terms of frequencies, which is similar to that adopted in the past; therefore this method has the following detects:

(1) Since a select signal to be applied to the transmission line has a high energy density at each of a clock frequency and the center frequency of the band-pass filter of a desired repeater, severe limitations are imposed on the code configuration.

(2) This leads to a difficulty in the measurement of variations in the error rate due to a modification of the code configuration in the testing of the transmission line turned back from each repeater.

(3) Because of the availability of the performance of narrow band-pass filters and the degree of energy concentration on a particular frequency depending on the code configuration, it is difficult to reduce the intervals between adjacent frequencies assigned to the repeaters, which presents a problem in a long repeatered system.

On the other hand, a land coaxial PCM relay system usually employs an arrangement in which several pairs of coaxial cables are housed as backward and forward transmission lines in one cable and regeneration in each transmission line is achieved by each of regenerators disposed in the same repeater housing. A submarine cable system employing optical fibers also adopts a similar arrangement in which several pairs of optical fibers are housed as backward and forward transmission lines in one cable and regeneration in each transmission line is effected by regenerators for the forward and backward transmission directions disposed in the same repeater housing. With such an arrangement, it is possible to provide an additional circuit in each repeater and couple regenerators to the backward and the forward transmission via the additional circuit. In the land coaxial PCM relay system, there is no precedent for this kind of monitoring system; but in an optical fiber transmission system, there has been proposed a system in which a signal in the backward transmission line is sent back to the forward transmission line via a switch in an electric circuit of an optical repeater (refer to Japanese Pat. No. 99904/76). But this method has such defects as follows:

(1) If a switch is inserted in a main transmission line, the reliability of the main transmission line system is markedly degraded.

(2) If a monitor signal composed mainly of repeater-identifying and selecting information is sent back as it is, a severe limitation is imposed on a test pattern of a repeatered line.

(3) A code error occurring in the backward transmission line and a code error in the forward transmission line cannot be separated.

SUMMARY OF THE INVENTION

An object of this invention is to provide a repeater selecting system which is free from the abovesaid defects of the conventional repeater selecting systems in the digital signal transmission line system and which does not employ any interstitial copper pair, permits a high degree of freedom in the code configuration of a repeater selected signal and is suitable for the long repeatered system.

Another object of this invention is to provide a monitor system for a digital signal relay system which overcomes the abovesaid defects of the conventional monitor system for the long distance PCM transmission system and which, by the installation of a simple device in a repeater, enables the transmission line terminal to accurately measure the code error rate of each relay circuit inserted in the transmission line and to locate a fault upon its occurrence, without using the interstitial copper pair.

BRIEF DESCRIPTION OF THE DRAWINGS

The principle, construction and operation of this invention will be clearly understood from the following detailed description taken in conjunction with accompanying drawings, in which.

DESCRIPTION OF THE PREFERRED EMBODIMENTS

Figure 1:
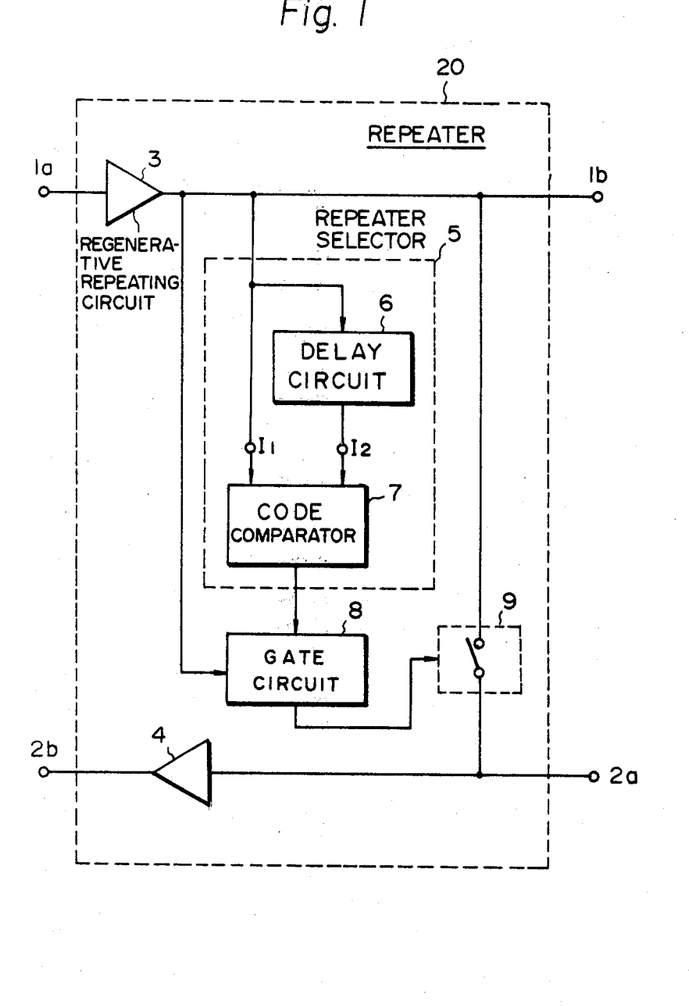
FIG. 1 is a repeater circuit diagram showing a first embodiment of this invention.

FIG. 1 shows a first embodiment of this invention as being applied to a monitor system in which a signal of the aforementioned backward transmission line is turned back to the forward transmission line in a binary PCM transmission system in which the presence and absence of a signal correspond to codes "1" and "0", respectively. In FIG. 1, reference numeral 20 indicates a repeater; 1a—1b designate a backward transmission line; 2a—2b identifies a forward transmission line; 3 and 4 denote regenerative repeating circuits respectively for the backward transmission line and the forward transmission line; 5 represents a repeater selector; 8 shows a gate circuit; and 9 refers to a switch which is controlled by the output from the repeater selector 5 to interconnect the backward transmission line 1a—1b and the forward transmission line 2a—2b. The repeater selector 5 is composed of a delay circuit 6 having a delay time $\tau_M$ peculiar to the repeater 20, and a code comparator 7 which has two input terminal $I_1$ and $I_2$ and in a case of both input signals being found to be substantially the same with each other, provides, as an output signal from the repeater selector 5, a signal for controlling the switch 9.

In this circuit, the gate circuit 8 is provided to detect an abnormal state of a transmitted signal on the transmission line 1a—1b, such as a train of "0" (that is, absence of a signal) or a train of "1" (that is, a non-modulated signal) and operates to prevent malfunction of the monitor system. The gate circuit 8 does not respond to an ordinary transmitted signal and a repeater selecting signal but passes the output from the repeater selector 5 to the switch 9.

Now, consider a case in which an ordinary transmitted signal is being transmitted over the transmission line 1a—1b. Since the code configuration of the ordinary transmitted signal is rendered into a pseudo random pattern so as to maintain clock frequency components, substantially no correlation exists between a signal at the input terminal $I_1$ of the code comparator 7 connected directly to the transmission line 1a—1b and a signal at the other input terminal $I_2$, which signal is delayed by the delay time $\tau_M$ of the delay circuit 6. Accordingly, the code comparator 7 does not generate a signal for controlling the switch 9; therefore the switch 9 is not switched to the ON-state.

Next, consider a case in which a repeater selecting signal provided on the transmission line 1a—1b is such a signal whose code configuration is repeated in the same repetition time as the delay time $\tau_M$ of the delay circuit 6 of the repeater 20. In this case, a code appearing at the input terminal $I_1$ of the code comparator 7 connected directly to the transmission line 1a—1b and a code at the other input terminal $I_2$ are always equal to each other. As a consequence, the code comparator 7 produces a signal for controlling the switch 9, by which the switch 9 transfers the repeater selecting signal transmitted over the backward transmission line 1a—1b to the forward transmission line 2a—2b, so that the transferred repeater selecting signal is sent back to the transmission line terminal equipment which is sending out the repeater selecting signal to the backward transmission line 1a—1b. In the terminal equipment, the code error rate characteristic of the transmission line including the backward transmission line 1a and the forward transmission line 2b turned back by the repeater 20 can be detected by the measurement of the error rate of the returned signal. Further, the code error rate in each repeater section can also be obtained by achieving the above measurement starting with the nearest repeater to the terminal equipment and by detecting a difference between the transmitted signal and the returned signal for each repeater.

Since the code configuration of each repeater selecting signal is appropriately selectable under a condition where it does not include in its repetition time any components of a repetition time equal to the delay time peculiar to any of the other repeaters, the code configuration for the measuring of the code error rate has a very high degree of freedom. Moreover, a particular delay time assigned to each repeater is selected to be an integral multiple of a unit transmission code length, but the repeater selection is sufficiently possible if the difference in the peculiar delay time between adjacent ones of the repeaters is the unit transmission code length, so that this invention is applicable even if the number of repeaters to be selected is large. For example, if the line speed is assumed to be 100 Mega Bits/second, the unit code length is 0.01 $\mu s$; therefore even in a case where the number of repeaters to be selected is 1000, it is possible to assign delay times from 10.00 to 19.99 $\mu s$ to the repeaters by steps of 0.01 $\mu s$. Besides, since the accuracy required of the delay time is 0.05%, such an accuracy can be easily obtained by any prior art delay circuit.

Figure 2:
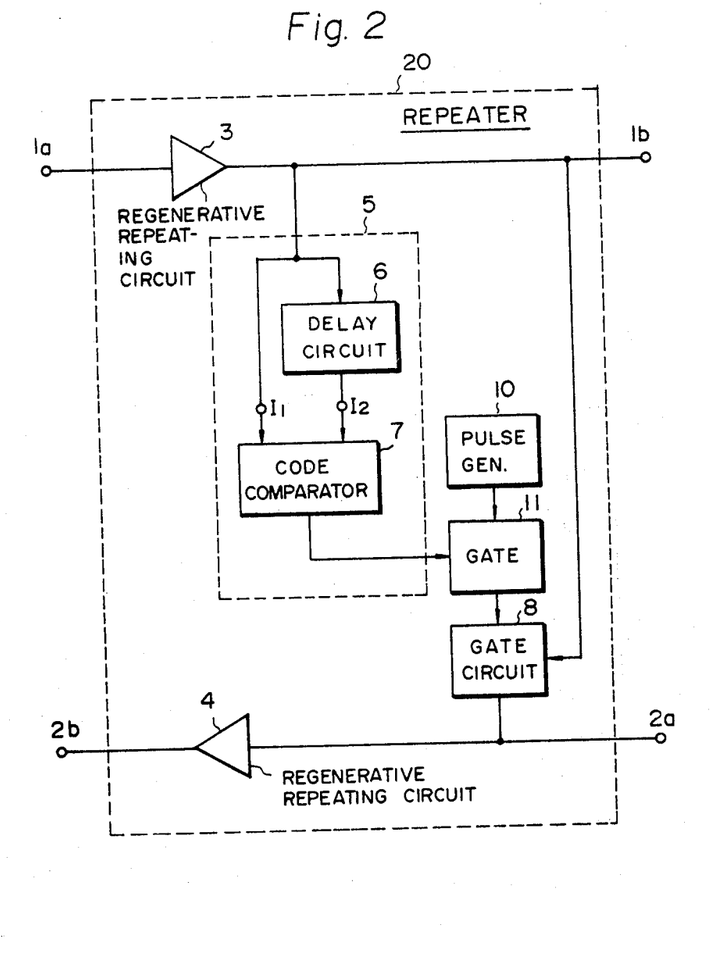
FIG. 2 is a repeater circuit diagram showing a second embodiment of this invention.

FIG. 2 illustrates a second embodiment of this invention applied to a monitor system in which the output from a pulse pattern generator incorporated in a repeater is sent out onto the transmission line and received by a terminal equipment in the binary PCM transmission system in which the presence and absence of a signal respectively correspond to codes "1" and "0". In FIG. 2, reference numerals 20, 3, 4, 1a—1b, 2a—2b, 5, 6, 7, 8 and $I_1$ and $I_2$ respectively indicate the same parts as those in FIG. 1. Reference numeral 10 identifies a pulse pattern generator for providing a pulse train of a known code configuration, and 11 denotes a gate which is controlled by the output from the code comparator 7. In the illustrated circuit, the gate circuit 8 is provided for exactly the same purpose and operates in exactly the same manner as in FIG. 1, and does not respond to an ordinary transmitted signal and a repeater select signal but passes the output from the repeater selector 5 to the forward transmission line 2a—2b. Further, the output of the repeater selector 5 is applied to the gate 11 in place of the switch 9 in FIG. 1.

When an ordinary transmitted signal is being transmitted over the transmission line 1a—1b, the repeater selector 5 composed of the delay circuit 6 and the code comparator 7 performs the same operation as in FIG. 1 and does not provide any output signal, so that the gate 11 is not opened so that no output from the pulse pattern generator 10 is transmitted to the forward transmission line 2a—2b.

Next, in a case of sending out, as a repeater select signal, to the transmission line 1a—1b a pulse train of a code configuration which repeats in a repetition time equal to the delay time $\tau_M$ of the delay circuit 6 of the repeater 20, as is the case with FIG. 1, the repeater selector 5 operates in the same manner as described previously in conjunction with FIG. 1, producing the signal for controlling the gate 11. As a consequence, the gate 11 operates to transmit the output from the pulse pattern generator 10 to the forward transmission line 2b. The output from the pulse pattern generator 10 is returned via the forward transmission line 2b to the system terminal equipment which sent out the repeater selecting signal to the backward transmission line 1a. In the terminal equipment, since the code configuration is known, measurement is effected for the received signal, by which it is possible to detect the code error rate of the forward transmission line from the selected repeater to the forward transmission line. Accordingly, the code error rates of respective repeater sections in the forward transmission line can be detected by achieving the measurement for the respective repeaters in an increasing order of the distance from the terminal equipment. With this monitor method, the backward transmission line is used as a control line for selecting one of the repeaters. It is evident that the present embodiment is also applicable to a system having a large number of repeaters to be selected, as is the case with the first embodiment.

While the foregoing embodiments have been described with respect to the case of delivering the repeater selecting signal onto the backward transmission line, it is also possible to send out the repeater selecting signal onto the forward transmission line and achieve the repeater selecting operation or to combine both of them. In the foregoing, this invention has been described as being applied to the PCM line transmission system but need not be limited specifically thereto and may be used in ordinary digital transmission systems.

Figure 3:
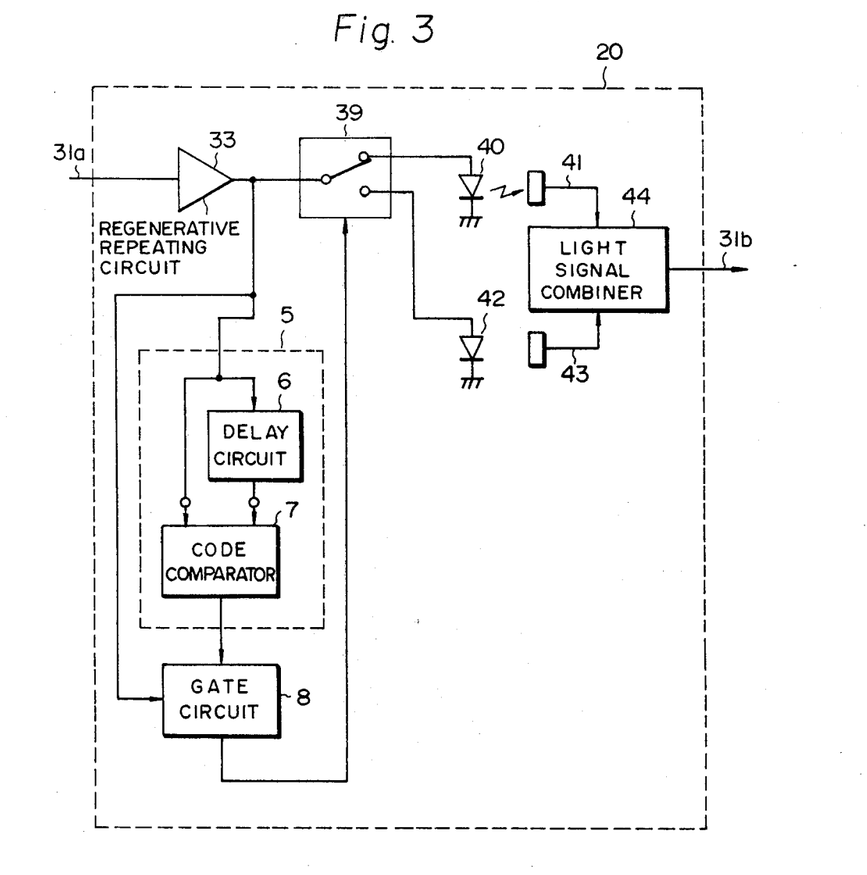
FIG. 3 is a repeater circuit diagram showing a third embodiment of this invention.

FIG. 3 shows a third embodiment of this invention applied to a highly reliable repeater for a long distance optical fiber transmission system which is designed so that when an element in the repeater is in fault, a spare element thereof is actuated. In the long distance optical fiber transmission system, a semiconductor laser is usually employed as a light emitting element, but at present, its service life is short and this is the basic cause of lowered reliability of the long distance optical fiber transmission system. Therefore, if use is made of such an arrangement in which a normally inoperative spare semiconductor laser is prepared in each repeater and actuated when a semiconductor laser being used reaches the end of its useful life, the reliability of the long distance optical fiber transmission system is markedly enhanced.

In FIG. 3, reference numeral 31a—31b indicates an optical fiber transmission line; 33 designates a regenerative repeating circuit composed of a photo detector and a semiconductor laser driver; 39 identifies a switch which is controlled by the output signal from the repeater selector 5 to change over a semiconductor laser drive current from a semiconductor laser 40 being driven to a spare semiconductor laser 42 and retains a self-holding state even after the removal of the switch drive signal; 41 denotes an optical fiber including an optical coupler for receiving light from the semiconductor laser 40; 43 represents an optical fiber including an optical coupler for receiving light from the semiconductor laser 42; and 44 shows a light signal combiner which combines light from the optical fibers 41 and 43 and provides the composite light on the optical fiber transmission line 31b. Reference numerals 5, 6, 7, 8 and 20 identify the same parts as those shown in FIG. 1.

In FIG. 3, when the repeater 20 is in its normal state, a transmitted signal on the transmission line 31a is electrically regenerated and amplified by the regenerative repeating circuit 33, thereafter being provided via the switch 39 to the semiconductor laser 40 to drive it. The light from the semiconductor laser 40 is provided on the transmission line 31b via the optical fiber 41 and the light signal combiner 44. In this while, no drive current flows to the semiconductor laser 42 and hence the laser 42 is not wasted. Now, let it be assumed that the semiconductor laser 40 reaches the end of its service life to reduce its radiation and cannot be used anymore. In such an instance, the repeater select signal referred to previously in the first embodiment is provided on the transmission line 31a for selecting the repeater 20. As a consequence, the repeater selector 5 and the gate circuit 8 operate in the same manner as described previously in the first embodiment, so that the code comparator 7 generates a predetermined output signal, which is applied via the gate circuit 8 to the switch 39 to control it. The switch 39 changes over the semiconductor laser drive current available from the regenerative repeating circuit 33 to the semiconductor laser 42 from the semiconductor laser 40 and holds this state. As a result of this, the semiconductor laser 42 starts to emit light, which is supplied to the transmission line 31b via the fiber 43 and the light signal combiner 44. Since the switch 39 holds the abovesaid state even after the removal of the repeater select signal, the semiconductor laser 42 is actuated in response to the subsequent transmitted signals. In the above, a semiconductor switch is employed as the switch 39 for the purpose of enhancement of reliability, but even a mechanical switch can also be used if it satisfies a required value of reliability.

In the above embodiment there is a single direction of signal transmission, but in a case of two backward and forward transmission lines being provided, it is also possible to adopt such an arrangement which sends out a repeater selecting signal onto the backward transmission line to change over a semiconductor laser in a regenerative repeater of the forward transmission line. Further, although the above embodiment has been described in connection with the case of changing over semiconductor lasers of a repeater in the long distance optical fiber relay system, it is also possible to similarly change over other elements than the semiconductor lasers, and this embodiment is not limited specifically to the long distance optical fiber transmission system but may also be applied to ordinary digital transmission systems.

Besides, the foregoing three embodiments have been described with regard to the case of controlling a switch or a gate circuit by the output from the repeater selector, but it is also possible to make distinctions of the contents of the code configuration of the repeater selecting signal and achieve a variety of complex control functions.

As has been described in the foregoing, the digital signal repeater selecting system of this invention has many advantages over conventional selection systems for digital signal repeaters, such as eliminating the requirement of a line for the exclusive use of the repeater selection, a high degree of freedom in the code configuration of the repeater selecting signal, applicability also to a PCM transmission system having a large number of repeaters to be selected and easy achievement.

Figure 4:
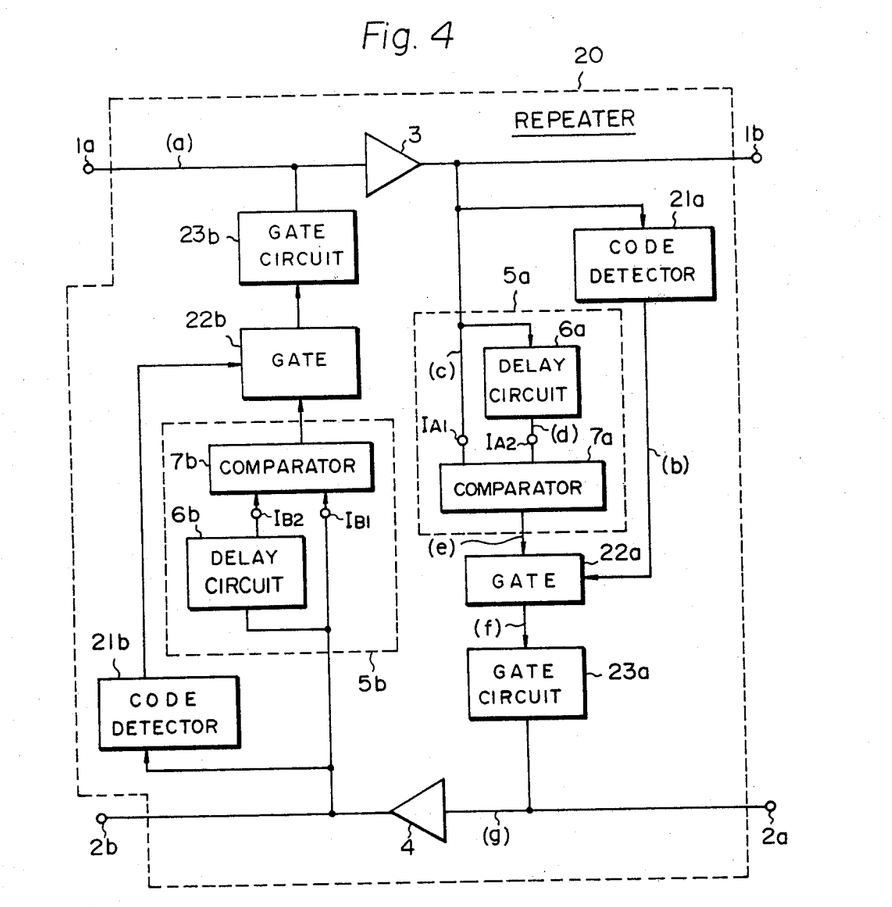
FIG. 4 is a circuit diagram showing the circuit construction in a repeater in another embodiment of this invention.

FIG. 4 shows the repeater circuit construction of another embodiment of this invention applied to a binary PCM transmission system in which the presence and absence of a signal correspond to codes "1" and "0", respectively. Reference character 20 indicates a repeater; 1a—1b designates a backward transmission line; 2a—2b identifies a forward transmission line; 3 and 4 denote regenerators for the forward transmission line 1a—1b and the backward transmission lines 2a—2b, respectively; 21a and 21b represent code detectors for controlling gates 22a and 22b, respectively, when codes "0" and "1" last for more than certain periods of time constants $\tau_A$ and $\tau_B$, respectively; 6a and 6b show delay circuits which respectively have delay times $\tau_{MA}$ and $\tau_{MB}$ peculiar to repeaters; 7a and 7b refer to comparators which respectively have two input terminals $I_{A1}$ and $I_{A2}$ and $I_{B1}$ and $I_{B2}$ and yield a code of a sign "1" or "0" in dependence upon whether two input codes are of the same sign or not; and 23a and 23b indicate gate circuits which when the codes of the sign "1" respectively last for more than the periods of time constants $\tau'_A$ and $\tau'_B$, connect them to the transmission lines 1a—1b and 2a—2b and disconnect them when more than a specified number (three in this example) of codes of the sign "0" occur in the periods of time constants $\tau'_A$ and $\tau'_B$. The delay circuit 6a and the comparator 7a make up a repeater selector 5a on the side of the transmission line 1a—1b, and the delay circuit 6b and the comparator 7b form a repeater selector 5b on the side of the transmission line 2a—2b. The suffix M indicates the circuits or constants of an Mth repeater from the transmission system terminal equipment and A and B indicate the circuits or constants associated mainly with the transmission lines 1a—1b and 2a—2b, respectively. The time constants $\tau'_A$ and $\tau'_B$ are set to be longer than the delay time $\tau_{MA}$ and $\tau_{MB}$ of all the repeaters, and $\tau_A$ and $\tau_B$ are set to be shorter than $\tau_{MA}$ and $\tau_{MB}$ of all the repeaters.

Turning to a timing chart of FIG. 5, the operation of the embodiment of FIG. 4 will be described. Now, let it be assumed that a code train having a repetition time T equal to the delay time $\tau_{MA}$ of the delay circuit $D_{MA}$ of the repeater 20 is provided as a monitor signal on the line 1a—1b from the terminal equipment for monitoring the backward transmission line from the terminal equipment to the repeater 20 and that the code train is such as shown in FIG. 5(a) which is not a train of "0" or "1" or does not include components whose repetition time is equal to the delay time of the delay circuit of any other repeater. In this case, since the signal on the transmission line 1a—1b is not "1" or "0" which lasts for more than the time $\tau_A$ (corresponding to four codes in this example), the code identify circuit 21a stops the opening state of the gate 22a, as shown in FIG. 5(b). The monitor signal (c) is applied to the input terminal $I_{A1}$ and, at the same time, via the delay circuit 6a to the input terminal $I_{A2}$, as shown in FIG. 5(d), but since the repetition time T is equal to the time $\tau_{MA}$, the codes at the input terminals $I_{A1}$ and $I_{A2}$ are always of the same sign and the comparator 7a produces a train of codes "1", as depicted in FIG. 5(e). In other words, the comparator 7a checks the correlation between the both input signals. The train of codes "1" derived from the comparator 7a is provided to the gate circuit 23a, as shown in FIG. 5(f), since the gate 22a is not closed (in the ON state). Since the train of codes "1" lasts for more than the time $\tau'_A$, the gate circuit 23a connects this code train to the forward line 2a—2b, as shown in FIG. 5(g). This train of codes "1" is returned via the backward line 2b to the transmission system terminal equipment having sent out the monitor signal to the transmission line 1a and is measured. In this instance, because of the train of the codes "1" in the transmission line 2b, the code detector 21b controls the gate 22b, so that the gate circuit 23b does not provide any codes on the transmission line 2a, which ensures stability of the transmission system. In the transmission system terminal equipment, since the train of codes "1" are sent back thereto, it is judged that the backward transmission line from the terminal equipment to the selected repeater 20 is in the normal state.

Figure 5:
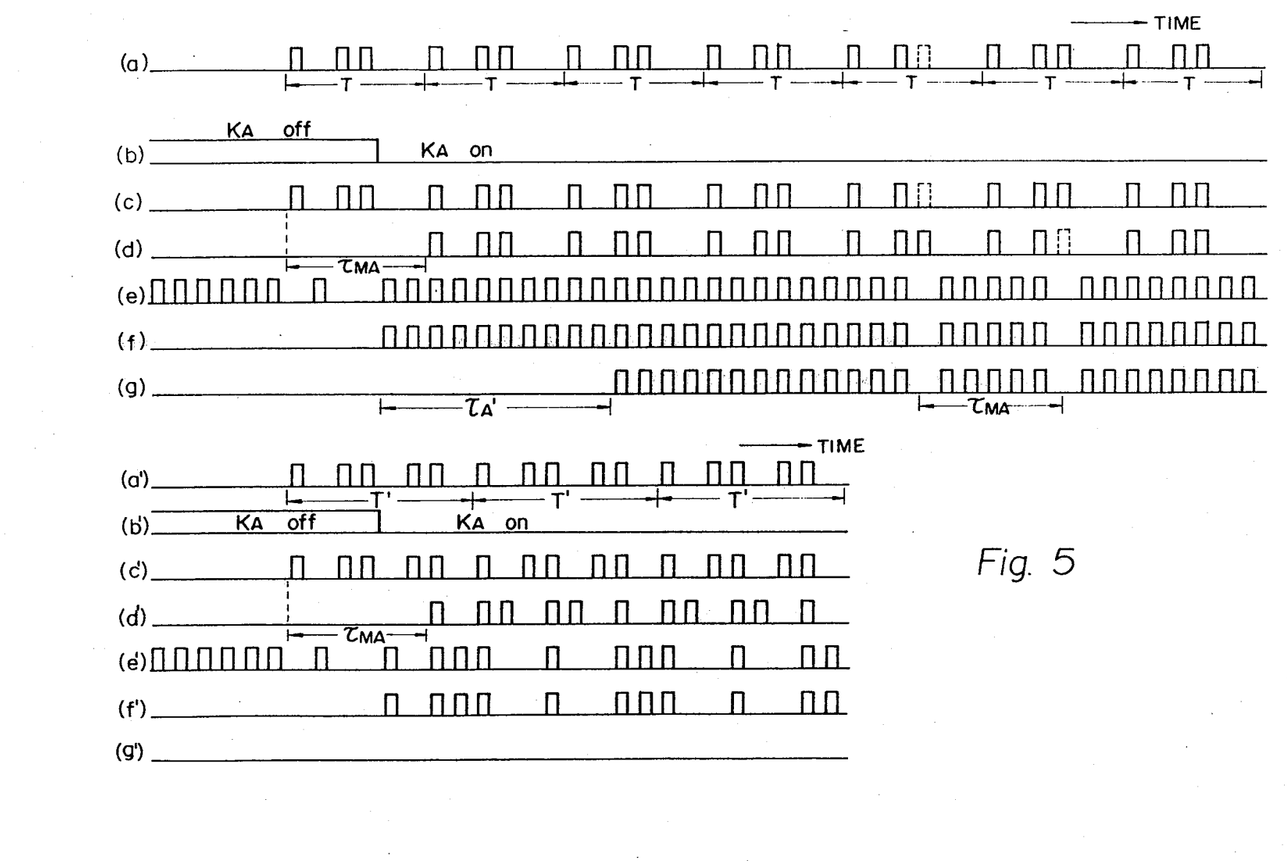
FIG. 5 is a timing chart explanatory of the operation of the circuit of this invention.

Next, assuming that the code "1" of the abovesaid monitor signal causes errors in the route from the transmission system terminal equipment to the repeater 20, as indicated by the broken line in a fifth period of FIG. 5(a), the comparator 7a produces a code "0" upon arrival of the false code and at a time $\tau_{MA}$ thereafter. On the other hand, since the signal on the transmission line 1a is not a train of the codes "0" or "1" which lasts for more than the time $\tau_A$, the gate 22a remains in its ON state. Accordingly, the code train including the code "0" is applied to the gate circuit 23a, as shown in FIG. 5(f). Since the number of codes "0" occurring in the time $\tau'_A$ is not three or more but two, the gate circuit 23a provides the code train in the form shown in FIG. 5(g) on the transmission line 2a—2b for the transmission to the transmission system terminal equipment in the same manner as described above. The transmission system terminal equipment detects and counts the pair of codes "0" in the time interval $\tau_{MA}$, by which it is possible to detect a code error in the transmission line 1a from the transmission system terminal equipment to the repeater 20. In this instance, it is considered that the code error occurring in the transmission line 2b, may cause an error in the code error counting in the transmission line 1a, but the probability of the code error in the transmission line 2b occurring in the time interval $\tau_{MA}$ is very slight and hence is negligible in practice. The above measurements do not require any signals from the transmitting terminal equipment on the side of the transmission line 2b.

Now, let it be assumed that the repetition time T' of the signal provided on the transmission line 1a from the terminal equipment differs from the delay time $\tau_{MA}$ and that the signal in this case is a code train such, for example, as shown in FIG. 5(a'). In this instance, the code detector 21a renders the gate 22a open (in the ON state), as is the case with the foregoing, but the sign of a code of FIG. 5(c') appearing at the input terminal $I_{A1}$ and the sign of a code (d') at the input terminal $I_{A2}$ do not exactly coincide, so that the output of FIG. 5(e') from the comparator 7a and the input of FIG. 5(f) to the gate circuit 23a are a train of "1" lasting for more than the time $\tau'_A$, and as a consequence, the gate circuit 23a does not apply this code to the transmission line 2a—2b, as shown in FIG. 5(g'). Accordingly, this circuit does not respond to an ordinary transmitted signal and selecting and identifying signals for the other repeaters, and the main transmission line system in this repeater is maintained in the normal state.

In the absence of a signal in the transmission line 1a—1b, each repeater regards it as a train of codes "0" and the code detector of each repeater produces a train of codes "1", so that a circuit is needed for preventing such malfunction. In this embodiment, the code detectors 21a and 21b have a function of judging the train of codes "0" as well as the succession of codes "1".

The invention has been described in detail with regard to the case of a monitor signal being transmitted over the line 1a—1b, but the same results as described above can also be obtained in a case of the monitor signal being transmitted over the line 2a—2b.

With this invention, it is possible to detect the code error rate of a transmission line from the transmission system terminal equipment to a selected repeater, so that the code error rates of respective repeater sections can be detected by achieving the above measurement for the respective repeaters in an increasing order of the distance from the transmission system terminal equipment.

The time $\tau_A$, $\tau_B$, $\tau_{MA}$, $\tau'_A$ and $\tau'_B$ can each be replaced by the number of codes. The gates 22a and 22b may also be inserted respectively between the circuit 23a and the transmission line 2a—2b and between the gate circuit 23b and the transmission line 1a. Further, the detection of the absence of a signal in the transmission line is not limited specifically to this embodiment.

Moreover, while this invention has been described as being applied to the binary PCM transmission system in which the presence and absence of a signal correspond to codes "1" and "0", respectively, the invention is not limited specifically thereto but may also be applied similarly to a multi-level code transmission system. Besides, the comparators 7a and 7b are described above to produce a code "1" when its input codes are of the same sign, but they are not restricted thereto and may also be adapted to produce a code train having a certain rule, for example, codes "1" and "0" alternately with each other, and further, in a case of the multi-level code transmission system these comparators may also be designed to have a code configuration suitable for the system used. At any rate, the gate circuits 23a and 23b and the comparators 7a and 7b are adapted to perform the same operations as described above to comply with the abovesaid rule.

In each repeater in this invention, highly accurate and stable circuits or elements heretofore proposed are used as each delay circuit, and the other circuits are all simple gate circuits and register circuits: therefore the circuits of each repeater are easily available.

As has been described in detail, this invention can achieve highly accurate detection of a repeater section in which a fault occurs, and highly accurate measurement of the error rate of each repeater section by housing simple circuits in each repeater and without using a monitoring line employed in the past or inserting a switch in the main transmission line system. Accordingly, this invention is of great utility from an industrial point of view.

What we claim is:

1. A digital signal repeater selecting system for a digital signal transmission system equipped with a plurality of digital signal repeaters disposed on a transmission line at desired intervals, comprising in each of the repeaters: a delay circuit having a particular delay time corresponding to an integral multiple of the unit code length of a digital signal and assigned to the repeater and having its input terminal connected to the transmission line; and a code comparator for comparing the input signal to and the output signal from the delay circuit with each other to produce a predetermined output signal when both signals are determined by the code comparator to be substantially identical with each other, wherein when a repeater selecting code train repeating in synchronism with the delay time is provided on the transmission line, the repeater to which the delay time is assigned produces the predetermined output signal from the code comparator to allow a selecting operation of the repeater.

2. A selection and monitor system for a digital signal transmission system having a backward transmission line and a forward transmission line, each having installed therein a plurality of digital signal repeaters, comprising at the position of a desired one of the repeaters: a delay circuit having a particular delay time corresponding to an integral multiple of a unit code length of a digital signal and assigned to the repeater and having its input terminal connected to one of the transmission lines; a comparator for comparing the input signal with the output signal of the delay circuit for each code element to produce a code "1" for the code element in which both the signals are identical with each other; and connecting means responsive to the output from the comparator to apply to the other transmission line a return code generated in accordance with a predetermined rule, wherein when a monitor code train having a repetition period equal to the delay time is applied to the one transmission line, the return code is sent back via the repeater to which the delay time is assigned and the other transmission line to monitor the digital signal repeating system.

3. A selection and monitor system for a digital signal transmission system according to claim 2, wherein the connecting means includes first gate means for applying the output from the comparator to the other transmission line only when the comparator output lasts for more than a certain period of time.

4. A selection and monitor system for a digital signal transmission system according to claim 2, wherein the connecting means includes second gate means for applying the output from the comparator to the other transmission line only when the digital signal lasts for more than a certain period of time.

5. A selection and monitor system for a digital signal transmission system according to claim 2, wherein the input of the delay circuit is connected to the output side of a regenerative repeater of the one transmission line, and wherein the output of the comparator is connected to the input side of a regenerative repeater of the other transmission line.

6. A selection and monitor system for a digital signal transmission system according to claim 2, wherein the connecting means includes means for converting a train of codes "1" from the comparator to a code train in accordance with a certain conversion rule, and wherein the sent back signal is the converted code train.

7. A selection and monitor system for a digital signal transmission system according to claim 2, wherein the connecting means is arranged so that the train of codes "1" derived at the output of the comparator is the return code.

* * * * *